United States Patent
Moghe et al.

(10) Patent No.: US 9,130,896 B2
(45) Date of Patent: Sep. 8, 2015

(54) DISTRIBUTED FUNCTIONALITY ACROSS MULTIPLE NETWORK DEVICES

(71) Applicant: Aruba Networks, Inc., Sunnyvale, CA (US)

(72) Inventors: Atul Moghe, San Jose, CA (US); Sai G. Sitharaman, Freemont, CA (US); Praveen Karadakal, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 258 days.

(21) Appl. No.: 13/791,568

(22) Filed: Mar. 8, 2013

(65) Prior Publication Data
US 2014/0258478 A1    Sep. 11, 2014

(51) Int. Cl.
G06F 15/177    (2006.01)
H04L 29/06    (2006.01)
H04L 12/24    (2006.01)

(52) U.S. Cl.
CPC .............. *H04L 63/00* (2013.01); *H04L 41/085* (2013.01)

(58) Field of Classification Search
CPC ........................... H04L 12/24; H04L 41/0823
USPC ................................ 709/220, 223; 726/11, 13
See application file for complete search history.

(56) References Cited

U.S. PATENT DOCUMENTS

| 7,254,832 B1 * | 8/2007 | Christie, IV ..................... 726/11 |
| 8,024,787 B2 * | 9/2011 | Oz et al. ........................... 726/13 |
| 2005/0039051 A1 * | 2/2005 | Erofeev ........................ 713/201 |
| 2007/0022474 A1 * | 1/2007 | Rowett et al. .................... 726/11 |

* cited by examiner

*Primary Examiner* — Frantz Jean

(57) ABSTRACT

According to one embodiment, a method comprises an operation of identifying a plurality of network devices, and detecting a presence of firewall processing functionality in a subset of the network devices. At least one of the network devices not in the firewall subset is configured to forward packets to a network device of the subset for firewall processing.

20 Claims, 6 Drawing Sheets

DISTRIBUTED FUNCTIONALITY ACROSS MULTIPLE NETWORK DEVICES

FIELD

Embodiments of the disclosure relate to the field of communications, and in particular, to a system, digital device and method that is directed to the managed distribution of communications.

GENERAL BACKGROUND

In recent years, digital communications have become an essential function in virtually every digital device, ranging from miniature hand-held digital devices (e.g. cameras, dual-mode cellular telephones, etc.) to networking equipment (e.g. controllers, routers, etc.). For instance, digital devices may be connected to a local area network (LAN) through Ethernet adapters for wired network communications, or wireless adapters such as those operating according to the well-known IEEE 802.11a/ac/b/g/n standards. Such connectivity enables information to be communicated with other digital devices directly or indirectly connected to the LAN.

In a centralized communication scheme, information commonly in the form of "packets" is forwarded from a digital device connected to the network to another digital device that controls functionality of the network, referred to as a "controller". Packet communications may be point-to-point, in which ingress packets are terminated at the controller, or carried out in a packet switching environment, in which the ingress packets in a given communication are terminated at the controller or are transient. Transient packets are packets that are received by the controller and are targeted to be forwarded to another device.

Switching platforms may be outfitted with enhanced capabilities compared to other switching platforms, such as firewall capabilities. These capabilities may include deep packet inspection, tighter session control and policing, and application visibility at a granular level among other capabilities. These enhancements may require extra cost that is not always needed within the particular switching platform. This can result in a non-uniform configuration when multiple modules are present that increases administration overhead and other costs.

BRIEF DESCRIPTION OF THE DRAWINGS

The invention may best be understood by referring to the following description and accompanying drawings that are used to illustrate embodiments of the disclosure.

DETAILED DESCRIPTION

Figure 1:
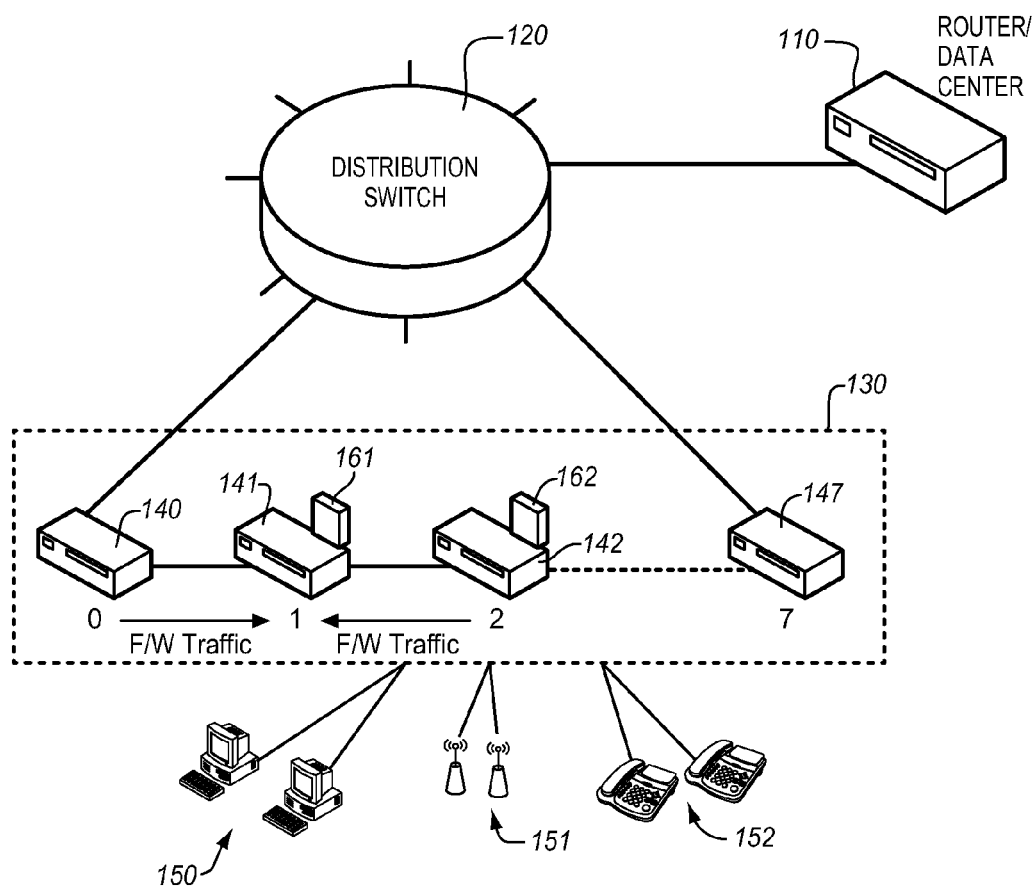
FIG. 1 is an exemplary embodiment of a network routing architecture incorporating a switching stack and a distribution switch.

Embodiments of the disclosure relate to a system, a digital device and method for distributed processing across multiple network devices. One example objective of distributed processing is to provide processing functionality for multiple network devices without providing processing functionality at each network device. Examples of processing functionality include firewalling. Firewalling functionality is referred to herein as an example for purposes of clarity, however, embodiments are applicable to any other functionality that may be distributed across multiple network devices.

The techniques described herein may be applied to other packet processing functionalities. These may include deep packet inspection for certain applications, encryption and decryption of AP (Access Point)/station tunnel traffic, and fragmentation and reassembly of oversized packets. Other functionalities may include network authentication mechanisms that allow users to be authorized to access a system and that apply appropriate access control. Other functionalities may include applying bandwidth contracts and rate limiting for certain types of traffic.

Embodiments of the disclosure relate to a system, a digital device and method for distributed access firewalling across multiple switching units. One example objective of distributed access firewalling is to provide firewalling for multiple switching units without providing firewalling capability at each switching unit.

Access firewalling on layer 2 and layer 3 access domains has been developed, in part, to provide tighter policy session control on access traffic. Such access firewalling may also make threats more visible, improve network address traversal and allow for more granular policy control and structures. In this model, access switches at layer 2 and layer 3 are equipped with firewall capabilities. In some cases, switching platforms that have hardware-accelerated firewall capabilities can achieve deep-inspection, tighter session control and policing, and application visibility at a finer granular level. With a large number of access switches at layer 2 and 3, there may be many access switches that do not have hardware or software firewall capabilities. As a result, the network configuration is not uniform and additional administration overhead is required to ensure stability.

A distributed control plane mechanism may be used to optimally route packets across multiple access-switching units in a stack to available firewall modules. The routed packets may be limited to those that require firewall capabilities. The control plane mechanism may be configured to automatically detect the presence or absence of one or more firewall modules in a stack that are then used to enable stateful capabilities on users and interfaces.

The configuration and administration of the firewalls may be centralized on a stack primary. This allows the network to be configured and used in different locations, with different users, and with different interfaces in a stack. There is greater control of firewall knobs with less network configuration and less packet routing overhead. At the same time, the distributed mechanism allows for flexibility in deployments A distributed mechanism, for example in software, may be used to detect and elect one of the access switch firewall modules as a configuration and administration active firewall module on the stack primary. This primary may be in a stacking system where session management occurs. The election may be based on various criteria including configured priority, number of hops from other members, stacking bandwidth along the path, etc.

Herein, certain terminology is used to describe features for embodiments of the disclosure. For example, the term "digital device" generally refers to any hardware device that includes processing circuitry running at least one process adapted to manage the flow of control traffic into the device. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral such as Apple® TV, a printer, a mobile handset, a smartphone, a personal digital assistant "PDA", a wireless receiver and/or transmitter, an access point, a base station, a communication management device, a router, a switch, and/or a controller.

One type of digital device, referred to as a "controller," is a combination of hardware, software, and/or firmware that is configured to process and/or forward information between digital devices within a network. According to one embodiment, the controller comprises a plurality of logic units that are adapted to manage ingress packets, one of these logic units being the control plane that processes control information used for the creation, operation, and management of the network.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") and process" are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

The term "interconnect" is a communication path between two or more digital devices. The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "message" is a grouping of data such as a packet, a frame, a stream (e.g., a sequence of packets or frames), an Asynchronous Transfer Mode (ATM) cell, or any other series of bits having a prescribed format. Herein, a message comprises a control payload and a data payload. The control payload is adapted to include control information such as source and destination Internet Protocol (IP) addresses (e.g., IPv4 or IPv6 addressing), protocol, source and destination port information, and/or packet type.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Certain details are set forth below in order to provide a thorough understanding of various embodiments of the disclosure, albeit the invention may be practiced through many embodiments other that those illustrated. For instance, illustrative embodiments describe firewall functionality but other functionality may also be similarly shared. Such discussions are for illustrative purposes and do not preclude this invention from being conducted on messages having formats other than described. Also, well-known logic and operations may not be set forth in detail in order to avoid unnecessarily obscuring this description.

I. General Architecture

FIG. 1 is a diagram of a general packet processing and routing system architecture with multiple switching units to serve multiple clients in one or more switching domains. A router or data center 110 is coupled to or includes a distribution switch 120 that is coupled to one or more other data centers and domains for packet communication. The distribution switch has uplink and downlink trunks to connect with a switching stack 130 that contains multiple access switching units.

The stack is shown as having eight access switches 140, 141, 142 . . . 147, however there may be more or fewer, depending on the particular implementation. The access switches serve one or more external clients or client ports. In one example, each access switch includes 12 to 48 Gigabit Ethernet ports or a Wi-Fi interface. The switching stack 130 is coupled to any of a variety of different client end connections and types, such as trusted or untrusted user data, workstation, and computing terminals 150, wireless access points 151, and voice terminals 152. The end terminals may be connected directly through a single one of the access switches or indirectly through the stack 130.

Some of the access switches, in this case switches 1 and 2 also include firewall functionality. Not all of the access switches may require firewall functionality. In the exemplary embodiment, the firewall functionality is provided by an added firewall module 161, 162 in each switch. The additional module may be incorporated into the switch housing and switch hardware or it may be provided as an additional module in the same chassis or a separate chassis. In one embodiment, an ASIC (Application Specific Integrated Circuit) module may be added to one or more of the switches to suit traffic demands and cost constraints. The firewall module may provide any of a variety of different additional capabilities to the access switch. These capabilities may include better user and interface level policy session control on access traffic, better visibility, network address traversal, and granular AAA (Authentication, Authorization, and Audit) policies.

In order to better use the firewall capabilities of some of the firewall capable modules, the firewall capabilities may be made available to the other modules that do not have this capability. So, for example, module 0 or 7 may, when necessary, send packets to module 1 or 2 for inspection. After inspection, the packets may be returned to module 0 or 7 for further processing. This allows greater benefit to be obtained from just a few firewall modules.

A distributed control plane mechanism may be used to route the packets to an available firewall ASIC module within the stack. The control plane may be realized in one or more of the access switches 140 or it may be supported in another location. In one exemplary embodiment, the control plane automatically detects the presence or the absence of one or more firewall modules in the stack. The detected firewall modules are then used to enable stateful capabilities on users and interfaces. Configuration and administration of firewall and other capabilities may be centralized on a stack primary. This allows for a configure-once-use-anywhere approach across users and interfaces in a stack.

A distributed mechanism may be provided using functions in each access switch in cooperation with the control plane to detect and elect a centralized active firewall module in a stacking system where session management occurs. This mechanism may be provided with the ability to elect a firewall module based on various criteria including configured priority, the number of hops from other members of the stack, the stacking bandwidth along the path, etc.

Figure 2:
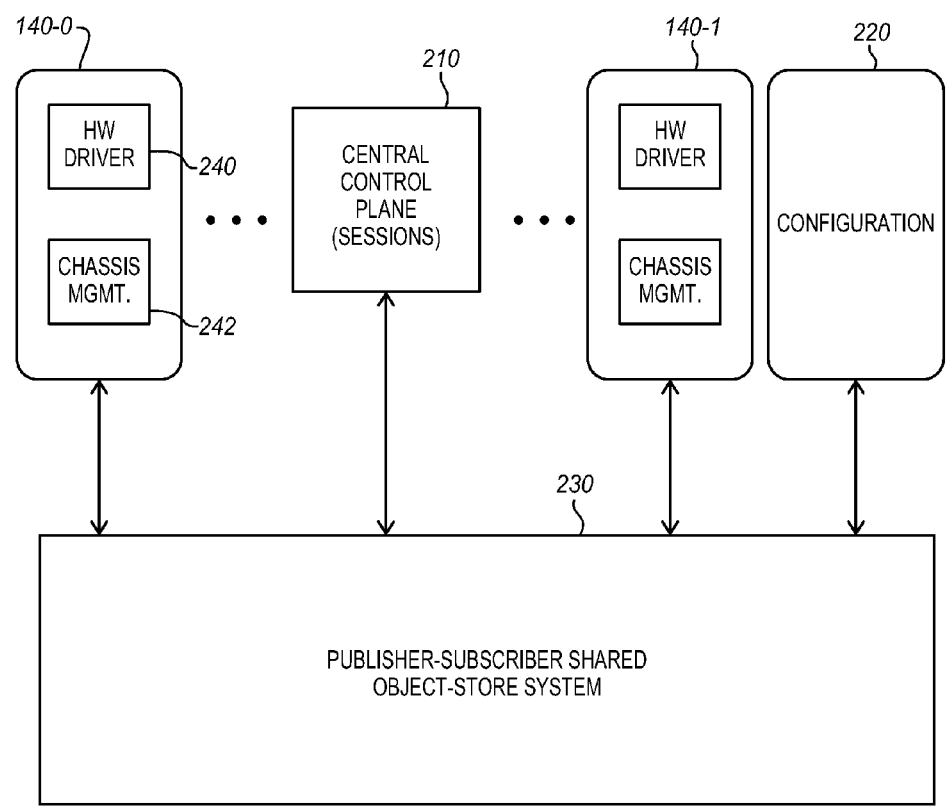
FIG. 2 is an exemplary embodiment of switching units of a stack coupled together through a control plane and a shared object store system.

FIG. 2 is a diagram of access switches 140-0, 140-1 in a switching stack. Each access switch contains at least a hardware driver 240 for external packet processing and configuration and a chassis management infrastructure to detect configuration and advertise the configuration to the network. The access switches are coupled together through a central control plane 210 that may run on an access switch or in some other device. The central control plane provides sessions for interactivity between the access switches.

The switches and the control plane are coupled to a shared object store system 230. A configuration module 220 containing the configuration of the stack and of each switch in the stack is also coupled to the shared object store system 230.

The shared object store system 230 detects the configuration of the switching stack on initialization and detects changes in the stack, for example, the addition or removal of a switch or the change in the capabilities or configuration of a switch. This can be provided to the central control plane for determining how to provide firewall capabilities to switches that do not have these capabilities.

II. Switching Unit Architecture

Figure 3:
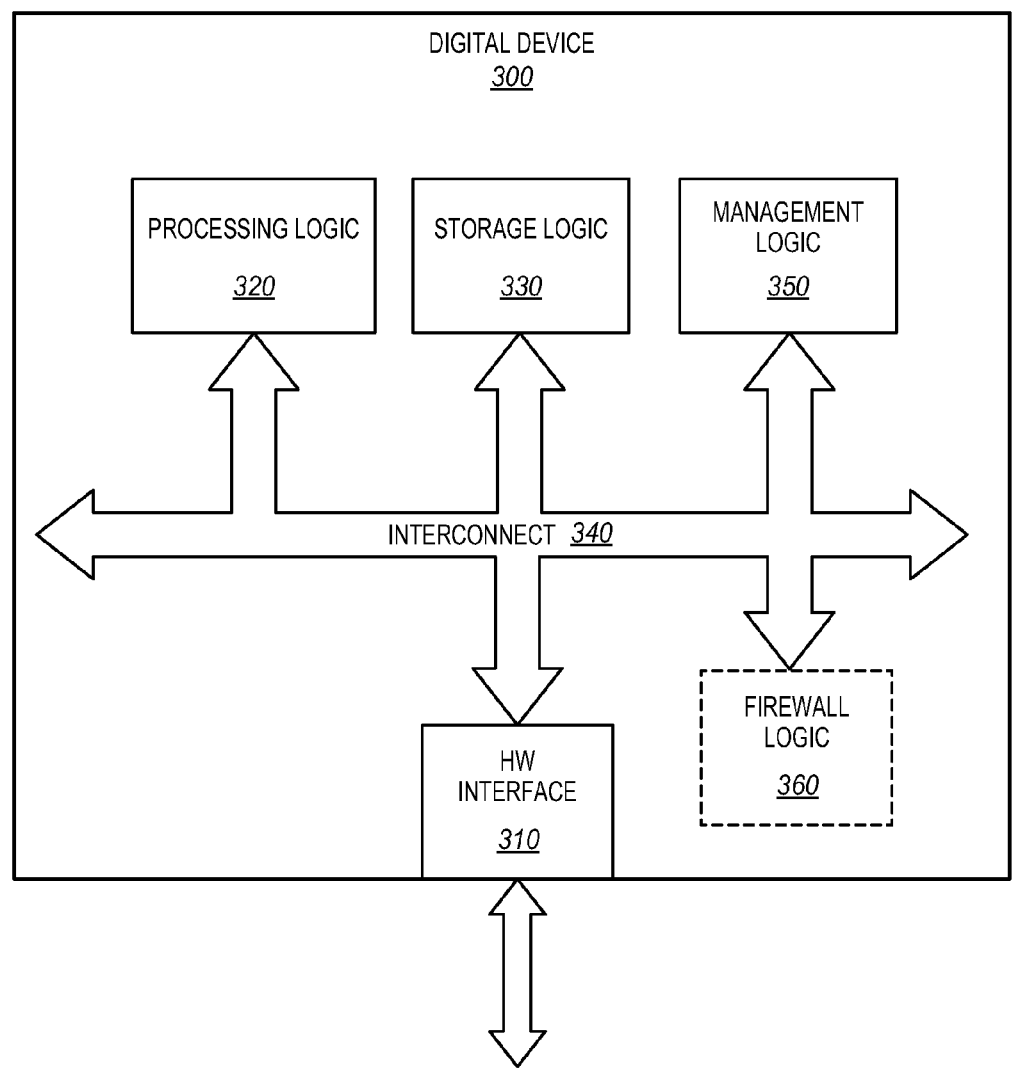
FIG. 3 is an exemplary embodiment of a switching unit incorporating a distributed access firewalling scheme.

Referring to FIG. 3, an exemplary embodiment of a digital device 300 is shown in block diagram form. In accordance with one embodiment of the disclosure, the digital device 300 comprises a hardware external interface 310, processing logic 320 and storage logic 330, in which one or more of these logic units are coupled together via an interconnect 340.

The interface 310 enables the digital device 300 to communicate with other devices supporting wired and/or wireless connectivity. For instance, the interface 310 may be implemented as a wireless adapter (e.g., one or more radios, antenna(s) or the like) adapted to receive ingress messages and/or a wired adapter (e.g. connector) through which ingress messages are received over a wired interconnect.

Processing logic 320 is adapted with logic to classify ingress packets, assign priority to these classified ingress packets, route the ingress packets and provide any other packet processing. The packet processing logic analyzes the control payload of received messages (packets) such as (1) destination IP (DEST IP) address, (2) source IP (SRC IP) address, (3) protocol, (4) destination port number (DEST PORT), and/or (5) source port number (SRC PORT). The payload is used with stored information corresponding to active processes running on the control plane of the digital device, to determine if the message is control, or data, and associated with an application.

As further shown in FIG. 3, storage logic 330 is volatile and/or non-volatile memory implemented within the digital device 300 and used by the processing logic 320. According to one embodiment of the disclosure, the storage logic 330 features content addressable memory (CAM) and/or random access memory (RAM) accessible by the processing logic 320.

As further shown in FIG. 3, the digital device also includes management logic 350 coupled to the interconnect 340 to provide chassis management, path routing management and internal system configuration using the storage logic. The digital device may also include firewall logic 360 for network protection. The firewall logic may provide deep packet inspection, session control, and application control. The firewall logic may be used to inspect and handle packets received at the hardware interface 310. These packets may be routed by the packet processing logic 310 or returned to a source digital device 110 for further packet processing.

III. Configuration of Distributed Access Firewalling

Figure 4:
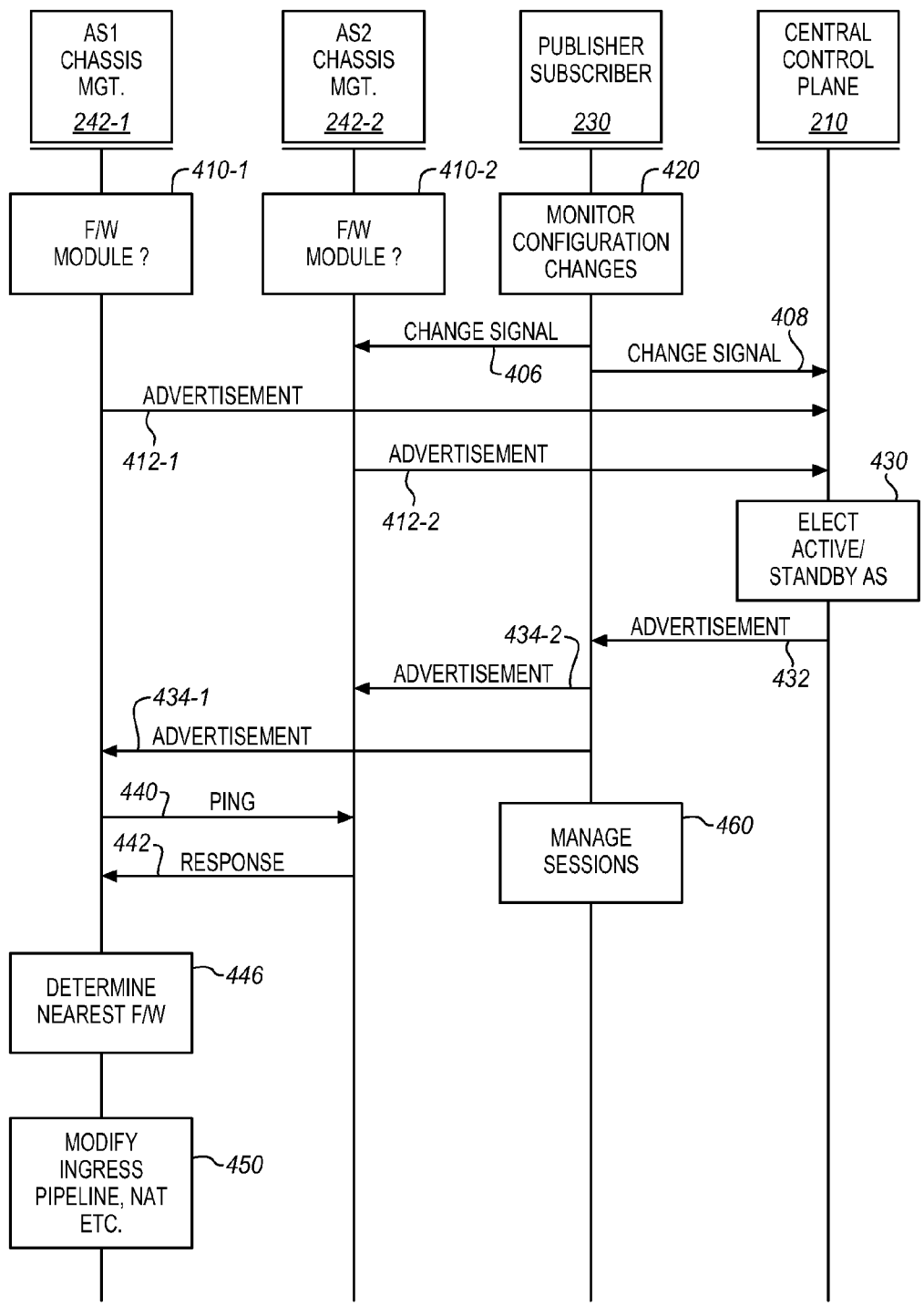
FIG. 4 is an exemplary embodiment of a signaling sequence for configuring a network for distributed access firewalling.

FIG. 4 is a diagram of a signaling sequence between a plurality of access switches and a central control plane. In this example, two access switches 140-1, 140-2 are represented by first 242-1 and second 242-2 access switch chassis management modules, however, any particular module, component, or portion of the access switch may be used.

The access switches (AS) communicate with a publisher/subscriber shared object store system 230 and a central control plane 210. These items are all shown in the functional block diagram of FIG. 2. The central control plane may be within one of the two access switches, another access switch or any other component, such as a router, distribution switch or other component of a network.

Each local chassis management infrastructure 242-1, 242-2 on each stack member detects 410-1, 410-2 the presence or absence of firewall capabilities at initialization. While initialization is shown as occurring at the same time at both access switches, this is only for example, purposes. Each switch may initialize itself independently or upon a change of capability. In some embodiments an AS may support hot swapping or run-time reconfiguration. For such an AS, there may be a change that is not accompanied by an initialization. The AS may then be provoked to detect the presence or absence of the chassis management module at other times.

The publisher subscriber system 230 may also be configured to detect configuration changes 420 in the network. It may then trigger one or more of the AS's in the network to detect a hardware or software configuration using a change signal 406. It may also determine when the network topology has changed and then trigger the AS's to redetermine connections and path lengths between the various nodes of the network using the change signal. As a result, the detection of firewall capabilities may be caused by the publisher subscriber system, a AS re-initialization, an AS reconfiguration, or some other trigger. The publisher subscriber may also send information regarding any detected changes to the central control plane 210 using e.g. a change signal. This reconfiguration is not only upon initialization but dynamic as the network architecture changes.

In one example the firewall capability is in the form of a separate removable hardware module, such as a firewall ASIC service module (FASM), however, the presence or absence of firewall capabilities may be in other forms. On initialization, an AS may perform a self-diagnostic to determine whether the FASM is present in the system.

The local chassis management infrastructure then advertises 412-1, 412-2, the presence or absence of the FASM. In the illustrated example, the advertisement is directly to the central control plane, or to a central control plane daemon.

The control plane daemon receives the advertisements from one or more of the nodes in the network and, using the advertisements, elects active and standby firewalls 430. This election may be based on the presence of FASM modules at a particular AS and also on proximity to other AS's that do not have a FASM module.

The control plane daemon advertises 432 active and standby FASM modules through the distributed publisher-subscriber system 230. This system can then propagate 434-1, 434-2 the advertisements to all of the available FASM modules in the stack. In this case, only two are shown, however, there may be many more.

The local chassis management infrastructure 242-1, 242-2 at each AS receives the advertisements and then is able to perform path configuration. Each AS may determine 446 the nearest firewall capability. For those that have internal firewall capability, there may be not determination. For those without firewall capability, the advertisements may be used to identify those that do have a firewall capability.

The local chassis management infrastructure determines a shortest route to an active FASM module. Paths to these other nodes may be determined, for example, using a ping 440, 442 or other mechanism. The AS chassis management may then determine 446 the nearest firewall modules.

Using the path information, the local chassis management infrastructure is then able to modify the packet ingress pipeline 450 to adapt to any network configuration changes.

In order to route traffic to an active FASM, the chassis management driver may modify a packet inter and intra VLAN (Virtual Local Area Network) ingress pipeline. A packet may be processed from VLAN assignment to Firewall to Bridge to Routing. For NAT (Network Address Translation) a packet may be processed from VLAN assignment to Firewall to Bridge to Routing to Firewall to Bridge. It may not be necessary for all of the packets to be routed through a firewall module for firewall processing. A selection may be made, for example, based on whether one or more local VLANs require firewall processing.

The local chassis management infrastructure, that is the control plane for an AS, using the advertisements may also program the paths such as a slow path, a fast path using network engines, and a path to a FASM module with firewall capabilities for VLANs. The control plane may also set the VLAN configuration, including the AAA (authentication, authorization, and accounting) profile and final-role policies, interface policies, firewall service policies, such as stateful sessions, NAT, fragmentation, reassembly, and quality of service.

In some embodiments, all active sessions in the stack are managed 460 centrally in slow path software. This helps in applying forward and reverse paths uniformly, as well in maintaining a global configuration of the VLAN (user and interfaces) that accommodates the firewalls.

In some embodiments, upon failover, the central control plane 210 reelects the prior standby FASM modules, if available, to take effect as the active FASM modules. New advertisements may be issued to each AS from the control plane. The corresponding slow-path control plane software may then become the new session master. If there no special firewall processing capabilities in any of the node of the network or in a stack, then the central control plane may reset all the firewall access lists, disable routing to any firewall, revert back to the original pipeline processing in hardware, and re-set the VLAN and firewall configurations.

Figure 5:
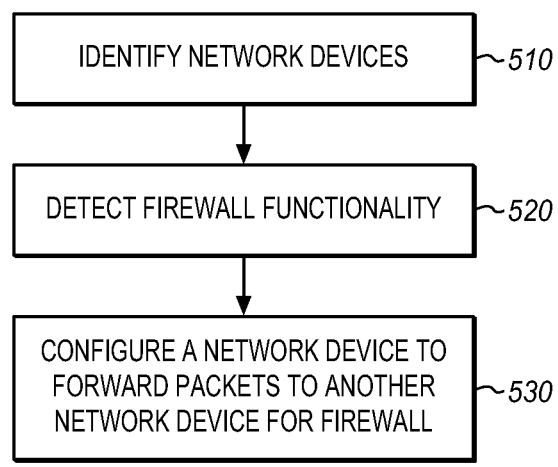
FIG. 5 is an exemplary embodiment of a general flowchart for configuring a network for distributed access firewalling.

FIG. 5 is a process flow diagram of configuring a set of paths in a network to share firewall capabilities among nodes of a switching stack. The process flow begins at 510 with identifying a plurality of network devices. These devices may be in a single switching stack or related in some other way. In some embodiments, the network devices are access switches, although the invention is not so limited.

At 520 a presence or a absence of firewall processing functionality is detected in the network devices. This may be only devices that have been recently initialized, or that have had a configuration change or it could be all of the network devices. In some embodiments of the whole plurality of network devices, only a subset of the network devices will have firewall capabilities. The rest of the devices either will not or will have a much slower firewall capability, such as a software firewall.

Here and in other examples provided in this description, the particular packet processing functionality that is detected and distributed is firewall functionality. However, the invention is not so limited. Similar techniques may be applied to many different functionalities that require substantial or specific processing resources or specific data resources including here and in FIG. 6. These functionalities may include deep packet inspection for certain applications, encryption and decryption of AP/station tunnel traffic, fragmentation and reassembly of oversized packets, network authentication mechanisms allowing users to authorize and have appropriate access control, and bandwidth contracts and rate limiting for certain types of traffic.

At 530 at least one of the network devices is configured to forward packets to another network device for firewall processing or servicing. Typically a device that does not have firewall capability or that has an absence of firewall capability will forward packets to a device that is in the subset of devices that has firewall processing. The second device will receive the packet perform the firewall processing and then either remove the packet as unsafe or return it to the first device for forwarding. The network device may be configured by sending a configuration file to the device or by sending network topology information to the device and allowing the device to configure its own paths. The configuration of block 530 may be only for firewall processing or it may include other path and routing information.

The process flow of FIG. 5 may be performed by a network device, by a central control plane, or by a combination. If performed by a network device, then the network device is able to discover other devices through any of a variety of discovery protocols. The network device can discover the presence or absence of firewall capability through its own initialization or other self-discovery process. It can also query other nodes to determine whether they have firewall functionality. Finally, using this information, it can configure itself by selecting a path to another device that includes the firewall capability.

If performed by a central control plane, then a process similar to that of FIG. 4 may be used. The device may receive identification, registration, or presence advertisement packets from the various network devices of the switching stack. At 520, it may receive additional advertisements or use the advertisements already received to identify all of the network devices and determine which ones are in the subset with firewall capability. Finally, it can use this information to send configuration information to each device or to send enough information that the network device can configure itself.

Figure 6:
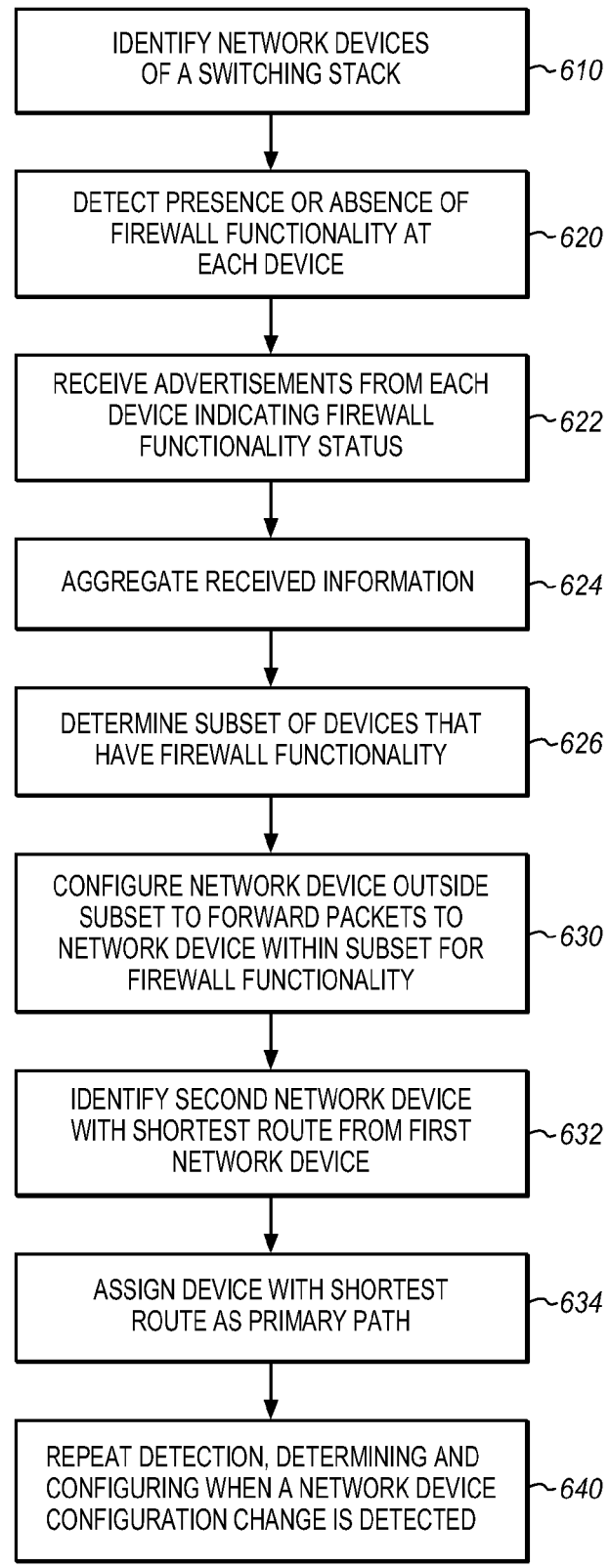
FIG. 6 is an exemplary embodiment of a specific flowchart for configuring a network for distributed access firewalling.

FIG. 6 is a process flow diagram showing additional optional features that may be added to or combined with the process of FIG. 5. At 610 network devices are identified using any of a variety of different network topology discovery protocols. These devices may be but are not necessarily the access switches of a switching stack as mentioned above.

At 620 the presence or absence of firewall functionality is determined for each discovered network device. This may be done, for example by receiving, from a network device, information such as an advertisement indicating the presence or absence of firewall processing functionality.

At 624, the information received from the network devices is aggregated. This may be used to further refine a map of the network topology and, at 626, the aggregation is used to determine the subset of the network devices that have firewall processing functionality.

At 630, the network devices outside of the subset are configured to forward packets to the network devices that are within the subset. This is to provide firewall functionality to the devices that do not already have it. At 632, for each network device outside of the subset, the network device within the subset with the shortest path is determined. At 634, this shortest path is assigned to be the primary path for firewall functionality. The shortest path device may be dynamically determined to accommodate network changes in path, routing, capabilities and presence of different devices. As a result the control plane may monitor the network and adapt the assignments dynamically as changes are made.

The shortest path or route may be measured by elapsed time for a packet to travel a round trip from the first network device to the second network device and back. Alternatively the shortest path may be determined by the number of hops in the path or by another efficiency measure. A cost-based selection system may be used to select device in the subset to assign to a device that is not in the subset. In this way a cost may be determined for each combination of each candidate device in the subset with the device that will be forwarding packets and the least expensive device may be selected and assigned as the primary path. A variety of different factors may be used alone or in combination to determine a cost. These include the number of links between the at least one of the first subset of network devices and the at least one of the second subset of network devices. Another factor may be the speed of at least one communication link between the at least one of the first subset of network devices and the at least one of the second subset of network devices.

At 640, the central control plane or each network device may be configured to detect when there is a change in the configuration of the network device. Such a change can be, for example, an addition, removal, or modification of a network device. Stated another way a dynamic reconfiguration may be triggered by a variety of different changes to the network. The triggers may include detecting a change in the particular packet processing functionality for at least one of the plurality of network devices, detecting an addition of a network device in the plurality of network devices, or detecting a removal of a network device in the plurality of network devices. When this happens, the central or local control plane can dynamically reassign the configured paths. This can be done by redetecting the presence of firewall processing functionality and then reconfiguring at least one of the network devices as may be appropriate to accommodate the change. This will normally be a change to the network devices that are not in the subset. The device may be reconfigured as now being in the subset or the path configurations may change to adapt to changes in other network devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as determined by the appended claims and their equivalents. For instance, any one or more of the described packet processing functionalities may be detected and packets may be forwarded to one or more different network devices for packet processing. Packet processing functionalities may be performed by dedicated hardware by software or by a combination. The described techniques may be applied to a variety of different types of network devices working in different combinations. The description is thus to be regarded as illustrative instead of limiting.

What is claimed is:

1. A non-transitory computer-readable medium comprising instructions which, when executed by one or more hardware processors, causes performance of operations comprising:
    detecting presence or absence of a particular packet processing functionality in each of a plurality of network devices;
    determining a first subset of the plurality of network devices that have the particular packet processing functionality from the plurality of network devices for which the presence or absence of the particular packet processing functionality has been detected;
    determining a second subset of the plurality of network devices that do not have the particular packet processing functionality from the plurality of network devices for which the presence or absence of the particular packet processing functionality has been detected;
    configuring at least one of the second subset of network devices to forward packets to at least one of the first subset of network devices when the particular packet processing is required for the processing of packets.

2. The non transitory computer-readable medium of claim 1, wherein the particular processing functionality comprises firewall processing functionality.

3. The non transitory computer-readable medium of claim 1, wherein the operations further comprise dynamically selecting the at least one of the first subset of the network devices from the first subset of network devices prior to forwarding the packets.

4. The medium of claim 1, wherein detecting the presence or absence of the particular packet processing functionality for a particular network device in the plurality of network devices comprises receiving, from the particular network device, information indicating the presence or absence of the particular packet processing functionality.

5. The non transitory computer-readable medium of claim 1, wherein detecting the presence or absence of the particular packet processing functionality for a particular network device in the plurality of network devices comprises determining whether the particular packet processing functionality is configured to be on or off for the particular network device.

6. The non transitory computer-readable medium of claim 1, wherein the operations further comprise selecting the at least one of the first subset of network devices for forwarding packets based on a least expensive path from the at least one of the second subset of network devices to the at least one of the first subset of network devices.

7. The non transitory computer-readable medium of claim 6, wherein the least expensive path is computed based on one or more of:
    a number of links between (a) the at least one of the first subset of network devices and (b) the at least one of the second subset of network devices; or a speed of at least one communication link between (a) the at least one of the first subset of network devices and (b) the at least one of the second subset of network devices.

8. The non transitory computer-readable medium of claim 1, wherein subsequent to configuring the one or more network devices, the operations further comprising reconfiguring the at least one of the second subset of network devices to forward packets to a different network device in the first subset of network devices in response to one or more of:
- detecting a change in the particular packet processing functionality for at least one of the plurality of network devices;
- detecting an addition of a network device in the plurality of network devices; or
- detecting a removal of a network device in the plurality of network devices.

9. The non transitory computer-readable medium of claim 1, wherein each of the plurality of network devices are physically connected to at least one other network device in the plurality of network devices.

10. The non transitory computer-readable medium of claim 1, wherein each of the plurality of network devices obtain information regarding one or more packet processing functionalities of at least one other network device in the plurality of network devices.

11. A system comprising:
- a plurality of network devices, wherein a first network device of the plurality of network devices comprises a hardware processor;
- wherein the system is configured for performing operations comprising:
- detecting presence or absence of a particular packet processing functionality in each of the plurality of network devices;
- determining a first subset of the plurality of network devices that have a particular packet processing functionality from the plurality of network devices for which the presence or absence of the particular packet processing functionality has been detected;
- determining a second subset of the plurality of network devices that do not have the particular packet processing functionality from the plurality of network devices for which the presence or absence of the particular packet processing functionality has been detected;
- configuring at least one of the second subset of network devices to forward packets to at least one of the first subset of network devices when the particular packet processing is required for the processing of packets.

12. The system of claim 11, wherein the particular packet processing functionality comprises firewall processing functionality.

13. The system of claim 11, wherein the operations further comprise dynamically selecting the at least one of the first subset of the network devices from the first subset of network devices prior to forwarding the packets.

14. The system of claim 11, wherein detecting the presence or absence of the particular packet processing functionality for a particular network device in the plurality of network devices comprises receiving, from the particular network device, information indicating the presence or absence of the particular packet processing functionality.

15. The system of claim 11, wherein detecting the presence or absence of the particular packet processing functionality for a particular network device in the plurality of network devices comprises determining whether the particular packet processing functionality is configured to be on or off for the particular network device.

16. The system of claim 11, wherein the operations further comprise selecting the at least one of the first subset of network devices for forwarding packets based on a least expensive path from the at least one of the second subset of network devices to the at least one of the first subset of network devices.

17. The system of claim 16, wherein the least expensive path is computed based on one or more of:
- a number of links between (a) the at least one of the first subset of network devices and (b) the at least one of the second subset of network devices; or
- a speed of at least one communication link between (a) the at least one of the first subset of network devices and (b) the at least one of the second subset of network devices.

18. The system of claim 11, wherein subsequent to configuring the one or more network devices, the operations further comprising reconfiguring the at least one of the second subset of network devices to forward packets to a different network device in the first subset of network devices in response to one or more of:
- detecting a change in the particular packet processing functionality for at least one of the plurality of network devices;
- detecting an addition of a network device in the plurality of network devices; or
- detecting a removal of a network device in the plurality of network devices.

19. The system of claim 11, wherein each of the plurality of network devices are physically connected to at least one other network device in the plurality of network devices.

20. The system of claim 11, wherein each of the plurality of network devices obtain information regarding one or more functionalities of at least one other network device in the plurality of network devices.

* * * * *